(12) United States Patent
Shin et al.

(10) Patent No.: US 11,780,390 B2
(45) Date of Patent: Oct. 10, 2023

(54) BUMPER FOR VEHICLE

(71) Applicants: Hyundai Motor Company, Seoul (KR); Kia Corporation, Seoul (KR); Seoyon E-Hwa Co., Ltd., Anyang-si (KR)

(72) Inventors: Ju-han Shin, Anyang-si (KR); Sung-noh Lee, Anyang-si (KR); Dong Eun Cha, Hwaseong-si (KR); Ki Hong Lee, Seoul (KR); Dae Hee Lee, Incheon (KR)

(73) Assignees: Hyundai Motor Company, Seoul (KR); Kia Corporation, Seoul (KR); Seoyon E-Hwa Co., Ltd., Anyang-si (KR)

( * ) Notice: Subject to any disclaimer, the term of this patent is extended or adjusted under 35 U.S.C. 154(b) by 116 days.

(21) Appl. No.: 17/493,084

(22) Filed: Oct. 4, 2021

(65) Prior Publication Data

US 2022/0105885 A1    Apr. 7, 2022

(30) Foreign Application Priority Data

Oct. 6, 2020   (KR) .......................... 10-2020-0129020
Oct. 27, 2020  (KR) .......................... 10-2020-0140467

(51) Int. Cl.
| | | |
|---|---|---|
| B60R 19/02 | (2006.01) | |
| B60R 19/18 | (2006.01) | |
| B60R 19/03 | (2006.01) | |

(52) U.S. Cl.
CPC .............. B60R 19/03 (2013.01); B60R 19/18 (2013.01); *B60R 2019/1853* (2013.01)

(58) Field of Classification Search
CPC .. B60R 19/18; B60R 19/03; B60R 2019/1853
See application file for complete search history.

(56) References Cited

FOREIGN PATENT DOCUMENTS

| | | | |
|---|---|---|---|
| GB | 0611682 A1 | * | 8/1994 |
| JP | S 6422653 A | | 1/1989 |
| JP | 2017013591 A | | 1/2017 |
| KR | 101819646 B1 | | 1/2018 |

* cited by examiner

*Primary Examiner* — Dennis H Pedder
*Assistant Examiner* — Melissa Ann Bonifazi
(74) *Attorney, Agent, or Firm* — MORGAN, LEWIS & BOCKIUS LLP

(57) ABSTRACT

A bumper for vehicle may include an injection-molded bumper cover; and a reinforcing structure provided in a linear shape with fiber reinforced composite material and coupled by direct fitting onto a rear surface of the bumper cover to reinforce a rear side of the bumper cover.

14 Claims, 4 Drawing Sheets

BUMPER FOR VEHICLE

CROSS-REFERENCE TO RELATED APPLICATION

The present application claims priority to Korean Patent Application Nos. 10-2020-0129020 filed on Oct. 6, 2020 and 10-2020-0140467 filed on Oct. 27, 2020, the entire contents of which is incorporated herein for all purposes by this reference.

BACKGROUND OF THE INVENTION

Field of the Invention

The present invention relates to a bumper for vehicle with an enhanced reinforcing structure.

Description of Related Art

Bumpers are mounted on the front and back of a vehicle for absorbing shocks from collisions to protect the vehicle body.

The bumper usually includes a bumper cover and a back beam coupled onto the back of the body of the bumper cover as a reinforcing structure. The back beam may be coupled onto the back of the main body of the cover through a coupling member.

Most back beams have been made with metal substances, but recently, back beams made of composite materials are being developed to improve fuel efficiency from weight reduction of car.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a bumper for vehicle that eliminates the demand for a back beam while ensuring protection against collision.

Various aspects of the present invention are directed to providing a bumper for vehicle configured for gaining effects of weight reduction of vehicle body, reduction in material cost, simplification of a manufacturing process, prevention of degradation of exterior beauty.

According to various exemplary embodiments of the present invention, a bumper for vehicle includes an injection-molded bumper cover; and a reinforcing structure provided in a linear shape with fiber reinforced composite material and coupled by direct fitting onto a rear surface of the bumper cover to reinforce a rear side of the bumper cover.

The bumper cover may include a cover main body with a front surface exposed to the outside thereof; a clip portion provided with a coupling groove, to which the reinforcement structure is fitted, and located behind the cover main body; and a connector connecting between the cover main body and the clip portion with a certain distance.

The cover main body may include an upper cover main body forming an upper portion of the bumper; and a lower cover main body forming a lower portion of the bumper, and the connector may include an assembly portion for assembling between the upper cover main body and the lower cover main body.

The assembly portion may include a first assembly portion extending backward from one of the upper cover main body and the lower cover main body; and a second assembly portion extending backward from the other of the upper cover main body and the lower cover main body, and the clip portion may be coupled to the cover main body with a distance through one of the first assembly portion and the second assembly portion.

The bumper cover may include an upper body forming an upper portion of the bumper; and a lower body forming a lower portion of the bumper and mounted with the upper body, and the reinforcing structure may be arranged on at least one of the upper body or the lower body.

The reinforcing structure may be provided in a linear shape which is kept unless no external force is applied but is bendable, and the clip portion may be provided in plural arranged in a longitudinal direction of the reinforcing structure to be spaced from each other.

The reinforcing structure may be limited in motion in the longitudinal direction while coupled to the clip portion.

The clip portion may be provided with a coupling groove to which the reinforcing structure is fitted, the reinforcing structure may have a section to be fitted to the clip portion, a diameter of the section corresponding to a size of the coupling groove, and a diameter of a section of the reinforcing structure located to a side of the clip portion may be greater than the size of the coupling groove.

The clip portion may be provided in plural arranged in the longitudinal direction of the reinforcing structure to be spaced from each other, the reinforcing structure may include a plurality of first diameter portions having a small diameter to be fitted to the clip portion; a plurality of second diameter portions having a diameter larger than the diameter of the first diameter portion to be located between the clip portions, and the plurality of first diameter portions and second diameter portions may be alternately repeated in the longitudinal direction of the reinforcing structure.

The clip portion may be provided in plural arranged in the longitudinal direction of the reinforcing structure to be spaced from each other, and the reinforcing structure may have both ends of the longitudinal direction of the reinforcing structure bent to be caught by the clip portion located on an outermost side thereof.

The cover main body may have at least some sections curved along a width direction of the vehicle, the clip portion may be provided in plural arranged in the longitudinal direction of the reinforcing structure to be spaced from each other, and the reinforcing structure may be provided in a linear shape which is bendable and kept in a shape of a straight line unless external force is applied thereto, so that at least some sections are bent to correspond to curvature of the cover main body while being fitted to the plurality of clip portions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
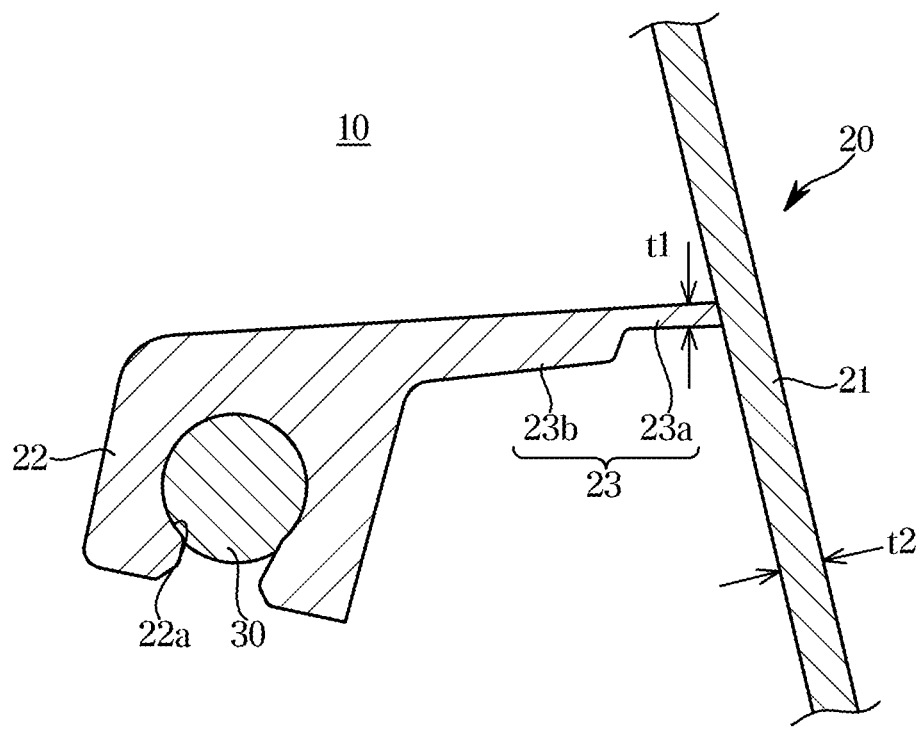
FIG. 1 is a cross-sectional view of a main portion of a bumper for vehicle, according to various exemplary embodiments of the present invention.
Figure 2:
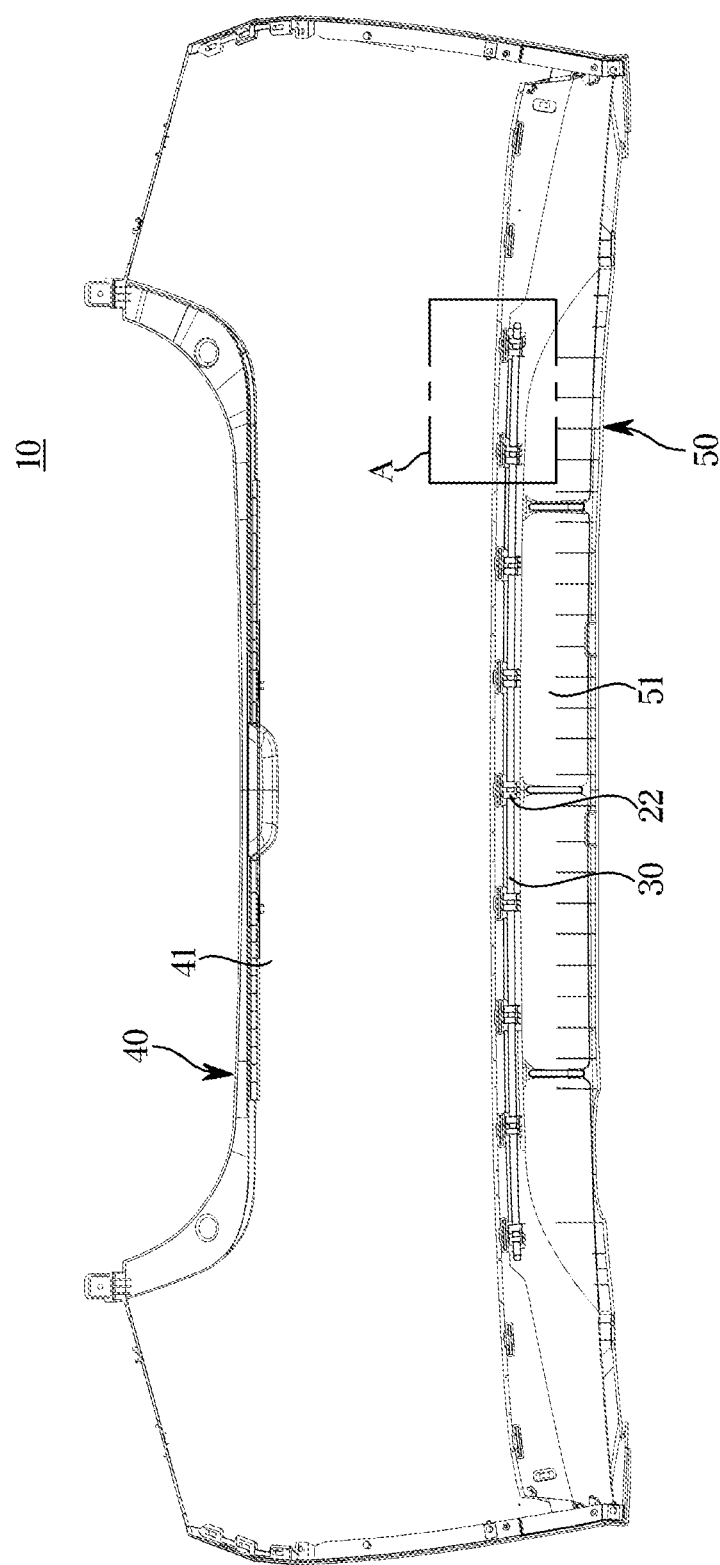
FIG. 2 is a rear view of a bumper for vehicle, according to various exemplary embodiments of the present invention.
Figure 3:
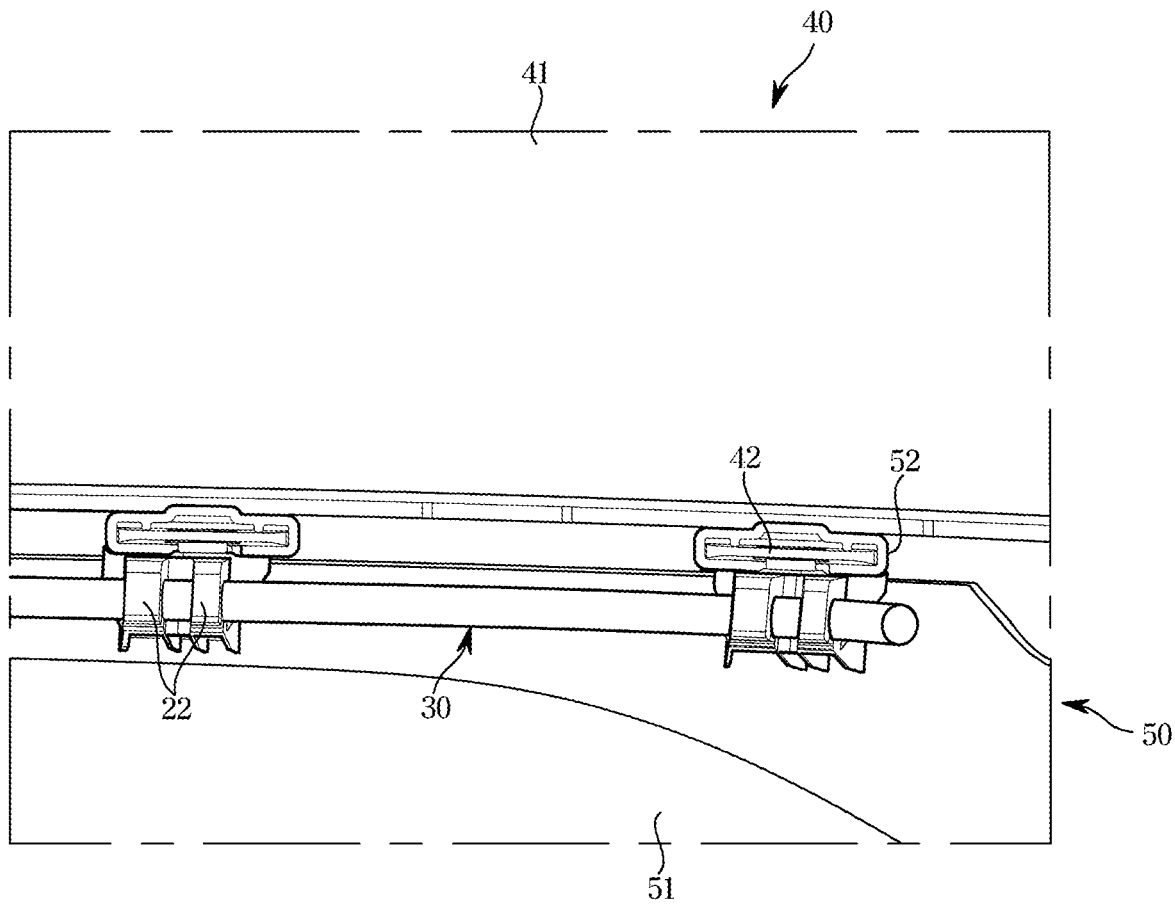
FIG. 3 is an enlarged view of portion A of FIG. 2.
Figure 4:
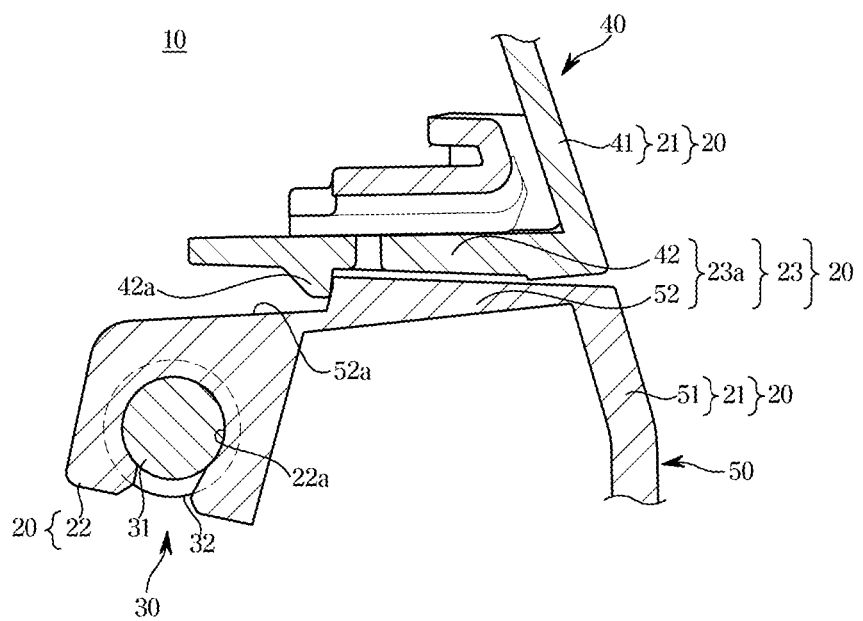
FIG. 4 is a side cross-sectional view of a main portion structure of FIG. 3.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to exemplary embodiments, which are illustrated in the accompanying drawings. The embodiments introduced below are provided as examples to convey the full spirit of the present invention to those of ordinary skill in the art to which the embodiments of the present invention belong. The present invention is not limited to the embodiments but may be specified in any other forms. For clarity, parts irrelevant to the description are omitted from the drawings, and in the drawings, the width, length, thickness, etc., of elements will be exaggerated for convenience. Throughout the specification, like reference numerals refer to the like elements.

A bumper 10 for vehicle is mounted on the front or the back of a vehicle to protect the vehicle body, and there may be a front bumper provided on the front and a rear bumper provided on the back.

The bumper 10 for vehicle according to various exemplary embodiments of the present invention may be employed as the front bumper as well as the rear bumper, but for convenience of explanation, it will be assumed herein that the bumper 10 for vehicle is employed as the rear bumper which is more likely to come into low-speed collision.

As shown in FIG. 1, the bumper 10 for vehicle includes a bumper cover 20 which forms an exterior. The bumper cover 20 forms the outermost side of the bumper 10 for vehicle such that the surface is externally exposed when the bumper cover 20 is mounted on the vehicle.

The bumper cover 20 may be manufactured by injection-molding a synthetic resin, and the shape of the bumper cover 20 may modified into various forms by taking into account the design or characteristics of the vehicle that employs the bumper for vehicle 10.

The bumper 10 for vehicle is provided with a reinforcing structure 30 coupled onto the rear surface of the bumper cover 20 to reinforce the bumper cover 20.

The reinforcing structure 30 may play a role to absorb impact energy while being deformed during a collision of the vehicle and distribute the impact from the collision uniformly to the vehicle body.

The reinforcing structure 30 may be formed with a fiber reinforced composite material in a linear shape arranged in the longitudinal direction of the bumper cover 20, and directly coupled onto the rear surface of the bumper cover 20 by being fitted to the injection-molded bumper cover 20.

The fiber reinforced composite material is a combination of at least two or more ingredients, which refers to a substance having a structure in which a reinforcing ingredient such as glass or carbon fiber is impregnated in a basic ingredient such as a resin.

The reinforcing structure 30 formed with such a fiber reinforced composite material may have relatively low weight while satisfying the same level of rigidity condition as compared to a back beam of the existing bumper formed with a metal sub stance.

Among the fiber reinforced composite materials, a continuous fiber thermoplastic (CFT) composite material manufactured by continuously impregnating a base ingredient with reinforcing fibers may be particularly suitable as a material for the reinforcing structure 30.

The CFT composite material has advantages of having high rigidity as well as securing mechanical properties as compared to other normal fiber reinforced composite materials, making it easy to manufacture the reinforcing structure 30.

Accordingly, as the reinforcing structure 30 is directly fastened onto the rear surface of the injection-molded bumper cover 20 in a fitting manner and thus integrated with the bumper cover 20, the bumper 10 for vehicle may ensure protection against collision and eliminate the demand for a back beam.

Furthermore, the reinforcing structure 30 formed with the fiber reinforced composite material has relatively less weight while satisfying the same vehicle body rigidity as compared to a metal back beam, contributing to a fuel saving effect from the reduction in vehicle body weight.

Furthermore, the bumper 10 for vehicle with the back beam omitted may eliminate the need not only for the back beam but also for a structure for coupling the back beam to the bumper cover 20, gaining advantages in terms of manufacturing efficiency such as reduction in material cost and simplification of a manufacturing process.

The reinforcing structure 30 containing fiber ingredients has a long and thin linear shape, which may gain elasticity in favor of impact absorption. The reinforcing structure 30 may have a linear shape with a circular cross-section.

The bumper cover 20 may include the cover main body 21 with a front surface externally exposed and the clip portion 22 to which the reinforcing structure 30 is fitted.

The cover main body 21 may have the form of a plate that extends along the vehicle width. The cover main body 21 may have both end portions in the longitudinal direction of the bumper cover 20 that are bent to cover both sides of the vehicle body on the rear side, and a portion between both the end portions of the cover main body 21 may be formed to be swollen backward to have gentle curvature. The reinforcing structure 30 may be coupled to the cover main body 21 to be positioned between both the end portions of the cover main body 21 with the gentle curvature.

The clip portion 22 may be arranged behind the rear surface of the cover main body 21, and provided with a coupling groove 22a for fitting of the reinforcing structure 30. The coupling groove 22a may be formed to be opened to the bottom portion of the clip portion 22.

The coupling groove 22a may be formed to wrap more than half of the circumference of the reinforcing structure 30, and when pressed toward the coupling groove 22a from the bottom portion of the clip portion 22, the reinforcing structure 30 may be fitted and fixed to the coupling groove 22a to be elastically supported by the coupling groove 22a.

The clip portion 22 may be continuously arranged in the longitudinal direction of the reinforcing structure 30 or provided in plural arranged to be apart from each other in the longitudinal direction of the reinforcing structure 30, so that the whole longitudinal sections of the reinforcing structure 30 may be coupled to the rear surface of the bumper cover 20 while stably supported on the rear surface.

The reinforcing structure 30 fitted in the coupling groove 22a may be bonded or thermally-fused to the clip portion 22 as required.

In the meantime, portions of the bumper cover 20 on the side of the clip portion 22, to which the reinforcing structure 30 is fitted, may be thicker in the forward and backward direction than neighboring portions, and accordingly, a sink mark may be formed on the front surface of the bumper cover 20 at a position corresponding to the clip portion 22 due to a partial difference in cooling speed during a cooling process of the injection-molded bumper cover 20 and may likely be exposed to the outside.

To solve the present problem, the bumper cover 20 may include a connector 23 for connecting between the cover main body 21 and the clip portion 22, and the connector 23 may connect between the cover main body 21 and the clip portion 22 with a distance between them.

With the present structure of the bumper cover 20, the clip portion 22 may be retreated behind the cover main body 21 and hidden by the cover main body 21 to be prevented from being exposed to the outside.

Accordingly, in the bumper cover 20, the clip portion 22 grows thick to be fastened with the reinforcing structure 30, eliminating the chance of a sink mark being externally exposed even when the sink mark is formed on the surface of the clip portion 22 during a cooling process after injection.

As a result, the reinforcing structure 30 prevents degradation of the beauty of the appearance of the bumper for vehicle 10, so that the bumper 10 for vehicle may reduce a constraint to employing the thick reinforcing structure 30 to reinforce the bumper cover 20.

To suppress formation of the sink mark on the front surface of the cover main body 21 due to the connector 23, the connector 23 may be provided to have at least an end portion connected to the cover main body 21 with a thickness t1 thinner than a thickness t2 of the cover main body 21.

Taking into the present account, the connector 23 may include a first connector 23a connected to the cover main body 21 and a second connector 23b connected to the clip portion 22. The first connector 23a may be formed to be thinner than the cover main body 21 and the second connector 23b may be formed to be thicker than the first connector 23a in consideration of strength of connection with the clip portion 22.

As shown in FIGS. 2 to 6, in another exemplary embodiment of the present invention, the bumper 10 for vehicle may include an upper body 40 with the bumper cover 20 forming the upper portion, and a lower body 50 mounted with the upper body 40 to form the lower portion.

The upper body 40 and the lower body 50 may be mounted together in an injection-molded state each, and the reinforcing structure 30 may be integrated with the bumper cover 20 by being fitted to the clip portion 22 arranged at one of the upper body 40 and the lower body 50.

The bumper 10 for vehicle with the upper portion and the lower portion separately manufactured may allow the reinforcing structure 30 to be provided at one of the upper body 40 and the lower body 50, which is selected as one in need of reinforcement by taking into account characteristics of the vehicle type.

In the instant case, the other of the upper body 40 and the lower body 50 where the reinforcing structure is not provided is not required to be modified from its injection-molded form in connection with the reinforcing structure 30. Accordingly, the bumper 10 for vehicle may have an advantage of employing the reinforcing structure 30 by deforming portion of the mold when viewed as a whole.

Alternatively, when the upper and lower portions of the bumper cover 20 both require reinforcement, the upper body 40 and the lower body 50 each have the clip portion 22 and a pair of reinforcing structures 30 may be provided to be fitted and coupled to the clip portions 22 of the upper and lower bodies 40 and 50.

The bumper cover 20 may include the cover main body 21 with the front surface exposed to the outside, the clip portion 22 to which the reinforcing structure 30 is fitted and coupled, and the connector 23 connecting between the cover main body 21 and the clip portion 22 while keeping the distance between them to prevent formation of a sink mark on the front surface of the cover main body 21 due to the clip portion 22.

The cover main body 21 may include the upper cover main body 41 forming the upper portion and the lower cover main body 51 forming the lower portion. The upper cover main body 41 may be provided through the front of the upper body 40, and the lower cover main body 51 may be provided through the front of the lower body 50.

The connector 23 may include an assembly portion 23a for assembling between the upper cover main body 41 and the lower cover main body 51.

The upper body 40 and the lower body 50 may be integrated with each other in a fastening method using a fastening member in addition to the assembly portion 23a, or in other various coupling structures including a bonding method.

The assembly portion 23a may include a first assembly portion 42 extending backward from the bottom portion of the upper cover main body 41, and a second assembly portion 52 extending backward from the top portion of the lower cover main body 51 to be coupled with the first assembly portion 42, so that the assembly portion 23a may be arranged in a border portion between the upper cover main body 41 and the lower cover main body 51.

The second assembly portion 52 may include an assembly hole 52a through which the first assembly portion 42 passes to be fitted thereto, and a projection 42a to be caught by the assembly hole 52a may be provided in the first assembly portion 42. Accordingly, the first assembly portion 42 and the second assembly portion 52 may be assembled together when the first assembly portion 42 is fitted to the assembly hole 52a of the second assembly portion 52 and supported with the projection 42a caught by the assembly hole 52a.

The clip portion 22 may be connected to the cover main body 21 through a bottom portion of the second assembly portion 52 with a distance thereto, accordingly, the bumper 10 for vehicle may prevent formation of sink marks on the front surface of the cover main body 21 due to the clip portion 22 for fastening of the reinforcing structure 30 even when the clip portion 22 is formed to be thick.

The first assembly portion 42 and the second assembly portion 52 may be interchangeably positioned as long as the first assembly portion 42 extends backward from one of the upper cover main body 41 and the lower cover main body 51 and the second assembly portion 52 extends backward from the other of the upper cover main body 41 and the lower cover main body 51.

The clip portion 22 may be connected to the cover main body 21 through the first assembly portion 42 and the second assembly portion 52 with a distance from the cover main body 21.

In the foregoing embodiments of the present invention, the clip portion 22 and the connector 23 may be provided in the shape of a thin rib in the longitudinal direction of the bumper cover 20 and the reinforcing structure 30.

The clip portion 22 in the rib shape with a thin width may be easily elastically deformable to facilitate elastic expansion of the coupling groove 22a during the fitting process of the reinforcing structure 30 to the clip portion 22.

The reinforcing structure 30 may be provided in a linear shape with elasticity, which is bendable but keeps in the straight shape unless external force is applied.

Furthermore, the clip portion 22 may be provided in plural arranged in the longitudinal direction of the reinforcing structure 30 at certain intervals.

Accordingly, while the reinforcing structure 30 provided in the straight shape is being fitted to the plurality of clip portions 22, at least some portions of the reinforcing structure 30 may be bent with curvature corresponding to that of the cover main body 21 to correspond to the shape of the cover main body 21 and thus coupled with the cover main body 21.

Furthermore, the bumper 10 for vehicle may be provided not only to guide the reinforcing structure 30 into a correct assembly position in a process of fitting the reinforcing structure 30 to the bumper cover 20 but also to suppress movement of the reinforcing structure 30 assembled with the bumper cover 20 in the longitudinal direction of the reinforcing structure 30.

Figure 5:
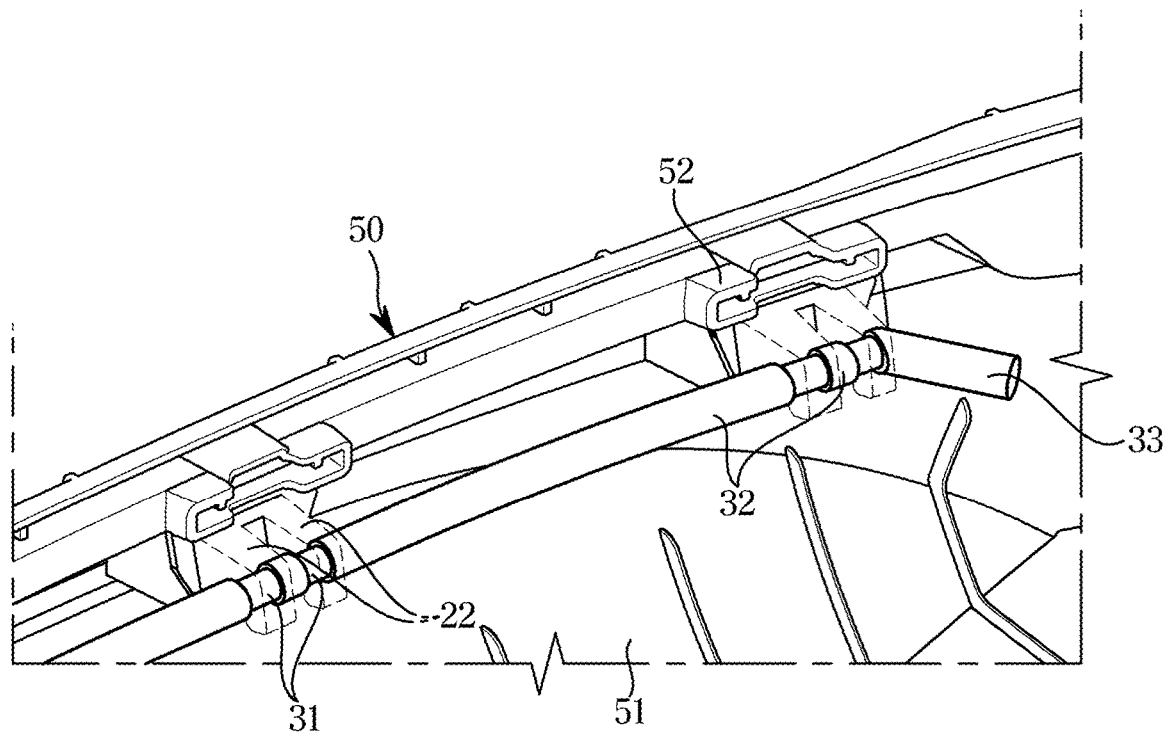
FIG. 5 is a perspective view of a separated lower body of a bumper cover of FIG. 3.
Figure 6:
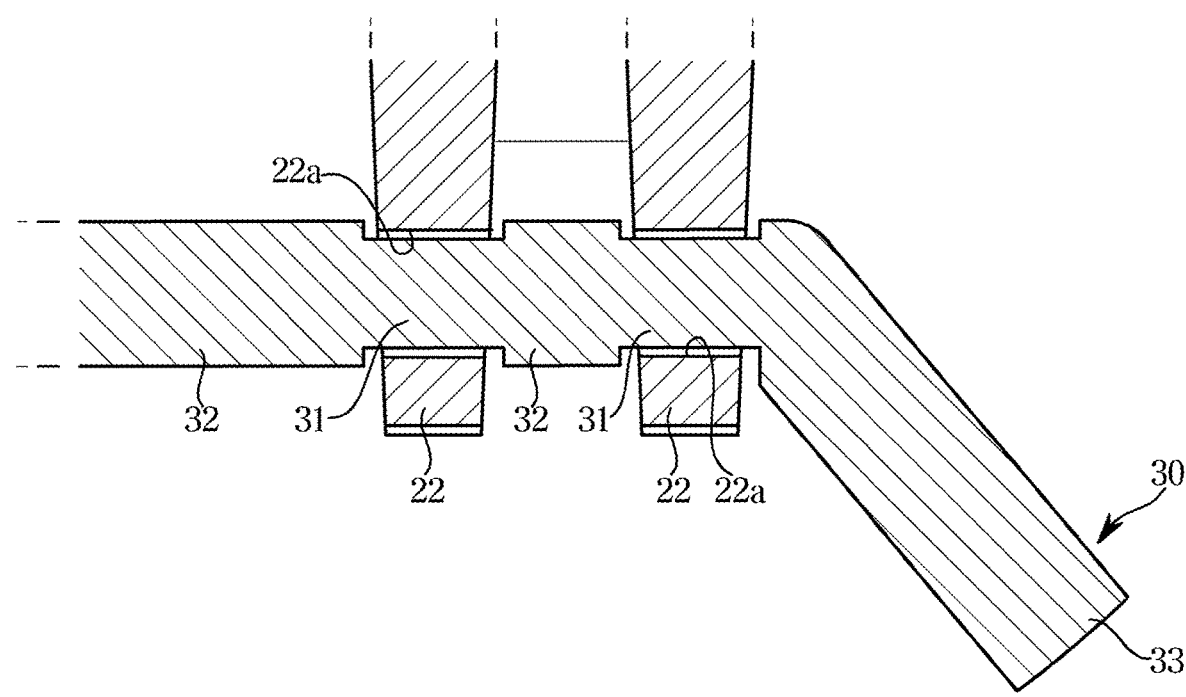
FIG. 6 is a plan view of a main portion of FIG. 5.

For this, as shown in FIG. 5 and FIG. 6, the reinforcing structure 30 may be provided to have sections with different diameters such that the reinforcing structure 30 may be caught by the clip portion 22 in the longitudinal direction of the reinforcing structure 30 while the reinforcing structure 30 is coupled with the clip portion 22.

For example, a section of the reinforcing structure 30 to be fitted to the clip portion 22 may have a diameter corresponding to the size of the coupling groove 22a, and a section of the reinforcing structure 30 between the clip portions 22 may have a diameter which is greater than the size of the coupling groove 22a. For reference, the clip portion 22 is drawn in an imaginary line in FIG. 5.

Referring to FIG. 5, the reinforcing structure 30 may have a form in which a first diameter portion 31 having a small diameter to be fitted to the clip portion 22 and a second diameter portion 32 having a diameter greater than for the first diameter portion 31 to be placed between the clip portions 22 are alternately repeated in the longitudinal direction of the reinforcing structure 30.

Furthermore, the reinforcing structure 30 may be bendable to allow both end portions of the reinforcing structure 30 in the longitudinal direction to be caught by the clip portions 22 located outermost.

For this, both the end portions of the reinforcing structure 30 may form bending portions 33, which may also perform the function of guiding the reinforcing structure 30 into a correct assembly position in a process of fitting the reinforcing structure 30 to the bumper cover 20 as well as suppressing movement of the reinforcing structure 30 assembled with the bumper cover 20 in the longitudinal direction of the reinforcing structure 30.

When there are bending portions 33 at both ends, the reinforcing structure 30 may be assembled into a right position on the bumper cover 20 and the movement of the reinforcing structure 30 may be suppressed even when the whole longitudinal portions of the reinforcing structure 30 have a uniform diameter corresponding to the size of the coupling groove 22a.

According to various exemplary embodiments of the present invention, a bumper for vehicle may have a structure that eliminates the demand for a back beam while ensuring protection from collisions.

According to various exemplary embodiments of the present invention, a bumper for vehicle may gain effects of weight reduction of vehicle body, reduction in material cost, simplification of manufacturing processes, prevention of degradation of external beauty.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A bumper for a vehicle, the bumper comprising:
   an injection-molded bumper cover; and
   a reinforcing structure provided in a linear shape with fiber reinforced composite material and coupled by direct fitting onto a rear surface of the bumper cover to reinforce a rear side of the bumper cover,
   wherein the bumper cover includes:
      a cover main body with a front surface exposed to the outside thereof;
      a clip portion provided with a coupling groove, to which the reinforcement structure is fitted, and located behind the cover main body; and a connector connecting between the cover main body and the clip portion while keeping a distance between the cover main body and the clip portion, wherein the cover main body includes:
an upper cover main body forming an upper portion of the bumper; and
a lower cover main body forming a lower portion of the bumper, and
wherein the connector includes an assembly portion configured for assembling between the upper cover main body and the lower cover main body.

2. The bumper of claim 1, wherein the assembly portion includes:
a first assembly portion extending backward from one of the upper cover main body and the lower cover main body; and
a second assembly portion extending backward from the other of the upper cover main body and the lower cover main body, and
wherein the clip portion is coupled to the cover main body with a distance to the cover main body through one of the first assembly portion and the second assembly portion.

3. The bumper of claim 2, wherein the second assembly portion includes an assembly hole through which the first assembly portion passes to be fitted thereto.

4. The bumper of claim 3, wherein the first assembly portion includes a projection configured to be caught in the assembly hole.

5. The bumper of claim 1, wherein the bumper cover includes:
an upper body forming the upper portion of the bumper; and
a lower body forming the lower portion of the bumper and assembled with the upper body, and
wherein the reinforcing structure is arranged on at least one of the upper body or the lower body.

6. The bumper of claim 1, wherein the reinforcing structure is provided in a linear shape which is bendable and kept in a form of a straight line unless external force is applied thereto, and the clip portion is provided in plural arranged in a longitudinal direction of the reinforcing structure to be spaced from each other.

7. The bumper of claim 1, wherein the reinforcing structure is limited in motion in a longitudinal direction while coupled to the clip portion.

8. A bumper for vehicle, the bumper comprising:
an injection-molded bumper cover; and
a reinforcing structure provided in a linear shape with fiber reinforced composite material and coupled by direct fitting onto a rear surface of the bumper cover to reinforce a rear side of the bumper cover,
wherein the bumper cover includes:
a cover main body with a front surface exposed to the outside thereof;
a clip portion provided with a coupling groove, to which the reinforcement structure is fitted, and located behind the cover main body; and
a connector connecting between the cover main body and the clip portion while keeping a distance between the cover main body and the clip portion,
wherein the reinforcing structure is limited in motion in a longitudinal direction while coupled to the clip portion,
wherein the clip portion is provided with a coupling groove to which the reinforcing structure is fitted,
wherein the reinforcing structure has a section to be fitted to the clip portion,
wherein a diameter of the section corresponds to a size of the coupling groove, and
wherein a diameter of a section of the reinforcing structure located to a side of the clip portion is greater than the size of the coupling groove.

9. The bumper of claim 8,
wherein the clip portion is provided in plural arranged in the longitudinal direction of the reinforcing structure to be spaced from each other,
wherein the reinforcing structure includes:
a plurality of first diameter portions having a diameter to be fitted to the clip portion; and
a plurality of second diameter portions having a diameter larger than the diameter of the first diameter portion to be located between the clip portions.

10. The bumper of claim 9, wherein the plurality of first diameter portions and the plurality of second diameter portions are alternately repeated in the longitudinal direction of the reinforcement structure.

11. The bumper of claim 7,
wherein the clip portion is provided in plural arranged in the longitudinal direction of the reinforcing structure to be spaced from each other, and
wherein the reinforcing structure has first and second ends in the longitudinal direction of the reinforcing structure bent to be caught by the clip portion located on an outermost side thereof.

12. The bumper of claim 1,
wherein the cover main body has predetermined sections curved along a width direction of the vehicle,
wherein the clip portion is provided in plural arranged in the longitudinal direction of the reinforcing structure to be spaced from each other, and
wherein the reinforcing structure is provided in a linear shape which is bendable and kept in a shape of a straight line unless external force is applied thereto, so that the predetermined sections are bent to correspond to curvature of the cover main body while being fitted to the plurality of clip portions.

13. The bumper of claim 1, wherein the connector includes:
a first connector connected to the cover main body; and
a second connector connected to the clip portion,
wherein a thickness of the second connector is larger than a thickness of the first connector.

14. The bumper of claim 13, wherein the thickness of the first connector is smaller than a thickness of the cover main body.

* * * * *